(12) United States Patent
Bogue et al.

(10) Patent No.: US 8,661,667 B2
(45) Date of Patent: Mar. 4, 2014

(54) HINGE ARM REPAIR

(75) Inventors: William Bogue, Hebron, CT (US); Michael J. Madel, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1082 days.

(21) Appl. No.: 12/638,410

(22) Filed: Dec. 15, 2009

(65) Prior Publication Data

US 2011/0138574 A1 Jun. 16, 2011

(51) Int. Cl.
*B23P 6/00* (2006.01)
*B23P 6/04* (2006.01)
*E05D 11/00* (2006.01)
*B23B 39/00* (2006.01)
*B23P 23/00* (2006.01)

(52) U.S. Cl.
USPC ............. 29/889.1; 29/402.01; 29/402.12; 29/11; 16/273; 16/386; 408/79; 408/97; 408/1 R; 409/132

(58) Field of Classification Search
USPC ............. 29/402.01, 402.03, 402.04, 402.06, 29/402.09, 402.11, 402.12, 402.14, 29/402.15, 889.1, 525; 16/273
See application file for complete search history.

(56) References Cited

U.S. PATENT DOCUMENTS

| | | | | | |
|---|---|---|---|---|---|
| 2,691,541 | A | * | 10/1954 | Benedek | 403/370 |
| 3,781,980 | A | * | 1/1974 | Possis | 29/596 |
| 4,002,139 | A | * | 1/1977 | Payne | 116/212 |
| 4,346,508 | A | * | 8/1982 | Baumann et al. | 29/402.18 |
| 4,549,708 | A | | 10/1985 | Norris | |
| 5,203,525 | A | | 4/1993 | Remlaoui | |
| 5,213,286 | A | | 5/1993 | Elliott et al. | |
| 5,350,136 | A | | 9/1994 | Prosser et al. | |
| 5,524,847 | A | | 6/1996 | Brodell et al. | |
| 5,906,029 | A | * | 5/1999 | Fox | 16/386 |
| 6,173,475 | B1 | * | 1/2001 | Senn et al. | 16/273 |
| 6,192,567 | B1 | * | 2/2001 | Newville | 29/402.11 |
| 6,588,991 | B2 | * | 7/2003 | Clunie | 408/115 R |
| 7,344,674 | B2 | * | 3/2008 | Williams | 264/553 |
| 8,307,514 | B2 | * | 11/2012 | Clark, Sr. | 16/386 |

* cited by examiner

*Primary Examiner* — David Bryant
*Assistant Examiner* — Jun Yoo
(74) *Attorney, Agent, or Firm* — Miller, Mathias & Hall LLP

(57) ABSTRACT

A hinge arm having a hinge pin hole having a worn bore, for example a hinge arm of a hinge assembly of an access door on a gas turbine engine, is repaired by forming in the worn hinge arm a new hole with a keyway extending outwardly from the new hole. A keyed bushing is provided having a cylindrical body having a central bore extending axially therethrough and a key extending outwardly from the cylindrical hole. The keyed bushing is inserted into the new hole and keyway formed in the hinge arm thereby preventing rotation of the bushing relative to the hinge arm.

17 Claims, 4 Drawing Sheets

HINGE ARM REPAIR

FIELD OF THE INVENTION

This invention relates generally to gas turbine engines and, more particularly, to the repair of a hinge arm of a nacelle access door hinge assemblies.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor. For a turbofan gas turbine engine, a large diameter fan is mounted to the engine shaft forward of the compressor. In the turbofan version of the gas turbine engine, a portion of the fan air is delivered to the compressor to pass through the engine core, while the remainder of the fan air passes through a bypass duct thereby bypassing the compressor engine core. Most large commercial jet liners of contemporary design use the turbofan version of the gas turbine engine to power the aircraft.

A nacelle forms a wrap that surrounds the gas turbine engine to provide an aerodynamic housing about gas turbine engine. In a turbofan gas turbine engine, the nacelle includes, from fore to aft, the engine inlet, the fan cowl, the engine core cowl after body and the primary exhaust nozzle. It is customary to provide access doors in various parts of the nacelle to permit service personnel to access various internal components for service, maintenance or replacement. These access doors are mounted on hinge assemblies designed to permit the access doors to pivot outwardly from a closed position to an open position. When in a closed position, the external surface of the access doors must be flush with the external surface of the nacelle to maintain an aerodynamic profile. Therefore, the hinge assemblies supporting the access door for pivotal movement are disposed on the inside of the nacelle body.

Typically, an access door is supported on one side, which is the pivot side, by at least two hinge assemblies. Each assembly includes a hinge arm mounted to the inside of the door and a bracket mounted to the inside of the nacelle body opposite the hinge arm. The distal end of the hinge arm is pinned between the distal ends of a pair of pivot arms mounted to the hinge bracket. A hinge pin extends through a hole in the distal end of the hinge arm in a press fit relationship.

The parts of the doors and hinge assembly are commonly made of aluminum in order to minimize the weight of the assemblies, but the hinge pin is made from a stronger material, such as steel. The end of the hinge pin, being made of aluminum, is prone to wear due to rubbing against the harder hinge pin, which over time causing the hole to elongate, thereby losing its original circular shape and tolerance, thus allowing the door to vibrate. Since fully heat treated aluminum has very poor weldability and exhibits a tendency to lose strength, which cannot be recovered when it is welded, repairing the hinge pin hole by welding is not practical.

Attempts may be made to repair worn hinge arms of this type by inserting a thin-walled, cylindrical bushing into the worn hole. Because the hinge assembly pivots around a hinge pin, the bushing must include an anti-rotation feature to prevent the bushing from rotating within the worn hole of the hinge arm. In conventional practice, the anti-rotation feature has been achieved by staking the bushing to the hinge arm. In conventional practice, staking is typically accomplished by passing a screw or pin from inside the bore of the bushing through the bushing wall into the hinge arm or by driving a screw or pin from one or both end faces of the bushing axially along the interface of the outer wall of the bushing and the bore of the hinge pin. However, these methods require enough structural thickness to be present both in the bushing and in the hinge arm. As hinge assemblies are commonly designed to minimize weight, and therefore material, sufficient parent material may not remain in the strap portion of the hinge arm when the hinge pin hole is overbored to accommodate and support a bushing having the wall thickness necessary for effective staking for anti-rotation by either of the aforedescribed methods. Thus, in many situations, both of the aforedescribed methods are impractical for enduring repair of such worn hinge arms on access door hinge assemblies. For similar reasons, attempts to provide anti-rotation by cementing a thin-walled bushing into the worn hole of the hinge arm using a press-fit or retaining compound have proven impractical.

SUMMARY OF THE INVENTION

A method is provided for repairing a hinge arm having a hinge pin hole having a worn bore, such as for example a hinge arm of a hinge assembly of an access door on a gas turbine engine. The method includes the steps of: forming in the worn hinge arm a new hole with a keyway extending outwardly from the new hole, the new hole having a larger diameter bore relative to the worn hinge pin hole; providing a keyed bushing having a cylindrical body having a central bore extending axially through the bushing and a key extending outwardly from the cylindrical body of the bushing; and inserting the keyed bushing into the new hole and keyway formed in the hinge arm. In an embodiment, the step of forming a new hole with a keyway extending outwardly from the new hole includes the steps of: drilling the new hole coaxially through the worn hinge hole, the new hole having a larger diameter bore relative to the worn hinge pin hole; and machining a keyway in the hinge arm, the keyway extending outwardly from the new hole. In an embodiment, the method may include the further step of sizing the key and the keyway may be sized relative to each other to provide a press-fit between the key and the keyway when the key is inserted into the keyway. In an embodiment, the method may include the further step of sizing the outer diameter of the keyed bushing and the bore diameter of the new hole relative to each other to provide a press fit between the keyed bushing and the bore of the new hole when the keyed bushing is inserted into the new hole in the hinge arm.

The method for repairing the hinge arm may include the further steps of: providing a staking hole extending transversely into the hinge arm through the keyway and the key of the keyed bushing disposed in the keyway; and inserting a staking pin into the staking hole, the staking pin extending transversely through the keyway and the key of the keyed bushing disposed within the keyway. In an embodiment, the method may include the further step of sizing a shaft of the staking pin relative to the staking hole to provide a press fit between the staking pin and the staking hole when the staking pin is inserted into the staking hole. In an embodiment, the staking pin may be retained in the staking hole by application of a retaining compound alone or in conjunction with providing a press fit. In an embodiment, the step of inserting a staking pin into the staking hole comprises threading a screw into the staking hole.

In an aspect of the invention, a repaired hinge arm is provided for a hinge assembly for an access door of a gas turbine engine. The repaired hinge arm includes a hole extending through a distal end of the hinge arm, the hole having a keyway extending outwardly from hole into the hinge arm, and a keyed bushing disposed within the hole through the hinge arm. The keyed bushing having a cylindrical body having an outer diameter, a central bore extending axially therethrough and a key extending outwardly from the cylindrical bore into the keyway. The outer diameter of the keyed bushing and the bore diameter of the hole may be sized relative to each other to provide a press fit between the keyed bushing and the bore of the new hole when the keyed bushing is disposed within said hole. The key of the keyed bushing and the keyway in the hinge arm may be sized relative to each other to provide a press-fit between the key and the keyway when the keyed bushing is disposed within said hole.

In an embodiment of the repaired hinge arm, the key of the keyed bushing may be staked to the keyway. In an embodiment, a staking hole extends transversely into the hinge arm through the keyway and the key of the keyed bushing disposed in the keyway, and a staking pin is disposed in the staking hole, with the staking pin extending transversely through the keyway and the key of the keyed bushing disposed within the keyway. The staking pin may be sized relative to the staking hole to provide a press fit between the staking pin and the staking hole when the staking pin is inserted into the staking hole. In an embodiment, a threaded staking hole extends transversely into the hinge arm through the keyway and the key of the keyed bushing disposed in the keyway, and a screw is threaded into the staking hole, the screw having a threaded shaft extending transversely through the keyway and the key of the keyed bushing disposed within the keyway.

BRIEF DESCRIPTION OF THE DRAWINGS

For a further understanding of the disclosure, reference will be made to the following detailed description which is to be read in connection with the accompanying drawings, wherein.

DETAILED DESCRIPTION OF THE INVENTION

Figure 1:
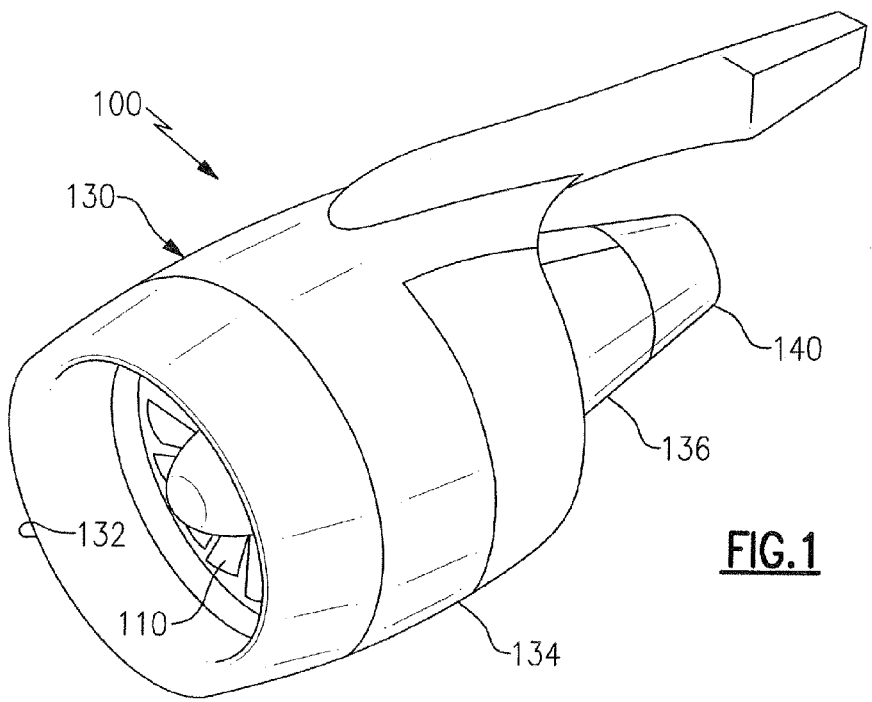
FIG. 1 is a perspective view of an exemplary embodiment of a turbofan gas turbine engine.
Figure 2:
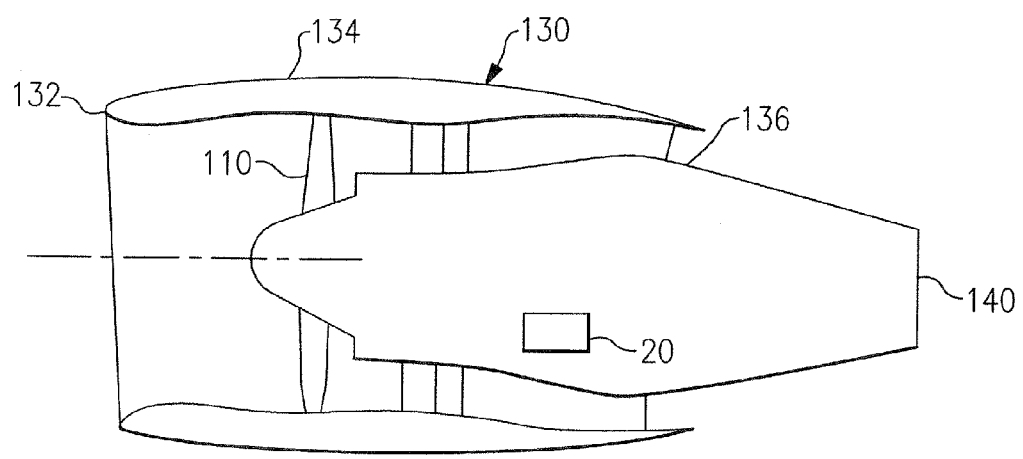
FIG. 2 is a schematic view of a longitudinal section of the exemplary embodiment of the turbofan gas turbine engine of FIG. 1.

Referring initially to FIGS. 1 and 2 of the drawing, an exemplary embodiment of a turbofan gas turbine engine, designated generally as 100, is shown. The turbofan gas turbine engine 100 includes, from fore-to-aft, a fan 110, a compressor module (not shown) a combustor module (not shown), a turbine module (not shown), and an exhaust nozzle 140. A nacelle 130 forms a housing or wrap that surrounds the gas turbine engine 100 to provide an aerodynamic housing about the gas turbine engine. In the turbofan gas turbine engine 100 depicted in the drawings, the nacelle 130 includes, from fore to aft, the engine inlet 132, the fan cowl 134, the engine core cowl 136 and the primary exhaust nozzle 140.

It is conventional practice to provide various access doors in various parts of the nacelle, such for example access door 20 in the engine core cowl 136, to permit service personnel to access various internal components, such as for example the engine gear box (not shown) housed within the engine core cowl 136, for service, maintenance or replacement. These access doors are mounted on hinge assemblies designed to permit the access doors to pivot outwardly from a closed position to an open position. When in a closed position, the external surface of the access doors must be flush with the external surface of the nacelle 130 to maintain an aerodynamic profile. Therefore, the hinge assemblies supporting the access door for pivotal movement are disposed on the inside of the nacelle body.

Figure 3:
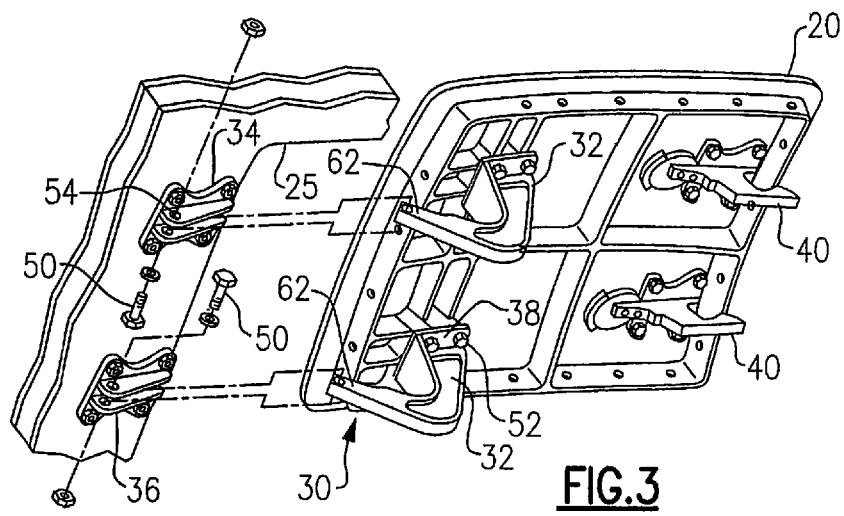
FIG. 3 is an exploded side elevation view of an exemplary embodiment of an access door and an associated hinge assembly.
Figure 4:
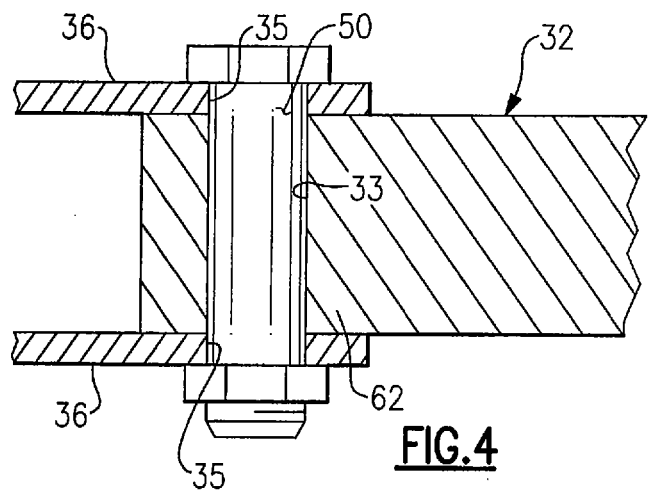
FIG. 4 is a sectioned side elevation view of an exemplary embodiment of a portion of a hinge assembly pre-repair.

Referring now to FIGS. 3 and 4, in particular, there is depicted in an exploded view an access door 20 that in a closed position covers the access opening 25 through the body of the nacelle 130. The access door 20 is mounted to the nacelle 130 by a pair of hinge assemblies 30. A pair of latches 40 may be mounted on the inside of the access door 20 along the side of the access door 20 from the access door is hinged. Although the access door 20 as depicted in FIG. 3 is supported for pivotal movement on a pair of hinge assemblies 30, it is to understood that it some applications, depending primarily upon the size and weight of the access door, the access door may be supported by a single hinge assembly or by two or more than two hinge assemblies.

Each hinge assembly 30 includes a hinge arm 32 mounted to the access door 20 to the structure of the access door 20 on the inside surface of the access door 20, a bracket 34 mounted to the body of the nacelle 130 on the inside of the nacelle 130, and a pair of pivot arms 36. The bracket 34 is secured to the nacelle 130 by bolts 54. Each of the pivot arms 36 is pivotally mounted at one end to the bracket 34 and, in assembly, is pivotally mounted at its other end, i.e. its distal end, to the hinge arm 32. Each of the pivot arms 36 has a hole 35 passing through its distal end for receiving a hinge pin.

The hinge arm 32 includes a base plate 38 by which the hinge arm may be secured to the structure of the access door 20, for example by bolts 52. The hinge arm 32 has a hole 33 passing through the distal end 62 of the hinge arm 32. When the hinge assembly 30 is assembled, the distal end 62 of the hinge arm 32 is inserted between distal ends of the paired pivot arms 36 with the respective pin receiving holes 35 and the pin receiving hole 33 aligned and with a hinge pin 50 inserted through the aligned holes 33, 35.

As noted previously, in conventional practice the various parts of the hinge assemblies are made of aluminum, a light weight material that has a relatively high specific strength corrected for density. However, aluminum is prone to wear. Consequently, over time in service, the hinge pin wears against the bore of the hole 33 in the distal end of the hinge arm 32, which results in the hole 33 becoming enlarged. Typically, the primary area of wear is on the distal side of the hole 33 which results in a thinning of the strap portion 38 of the hinge arm 32. The enlargement of the hole 33 over time also results in the hinge arm 32 having too loose a fit relative to the hinge pin.

Figure 5:
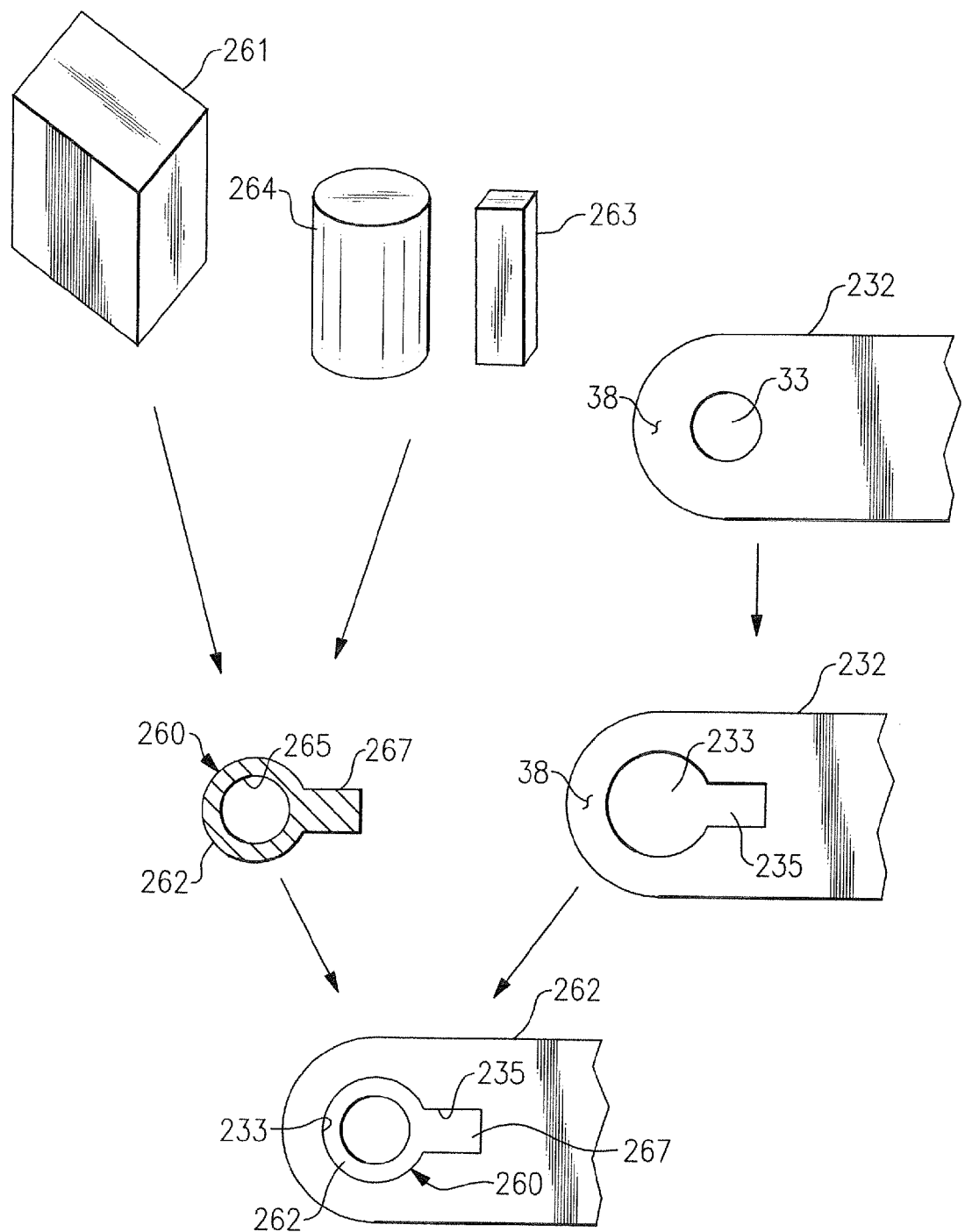
FIG. 5 is a schematic illustration of an exemplary embodiment of a process of repair an access door hinge in accordance with the invention.

Referring now to FIGS. 5-8 in particular, the repair of a hinge assembly according to the method disclosed herein is illustrated in FIG. 5 and embodiments of a hinge assembly repaired in accordance with the method disclosed herein are illustrated in FIGS. 6, 7, 8A and 8B. To repair a worn hinge arm 232, the hinge arm 232 is disassembled from hinge assembly and the hole 33 through the worn hinge arm 232 is redrilled to form a new hole 233 that has a larger bore diameter than the original hole 33. The larger bore of the new hole 233 is sized to accommodate a bushing to be inserted the hole 233, which will be discussed in further detail later herein. Additionally, a keyway 235 is machined into the bore wall of the hole 233 away from the strap portion 38. Forming the keyway 235 in the strap portion 38 should be avoided as doing so could, in some applications, weaken the strap portion 38 to the point that the strap portion 38 is susceptible to eventual structural failure. The keyway 235 extends coaxially with the bore along the entire axial extent of the hole 233 through the hinge arm and extends radially outwardly from the bore of the hole 233 into the hinge arm 232 on the side of the hole 233 opposite the strap portion 38 at the distal end of the hinge arm 232.

A keyed bushing 260 is inserted in the overbored hole 233 and the keyway 235. The keyed bushing 260 comprises a cylindrical body 262 having a key 267 extending axially along one side of the cylindrical body 262 and projecting radially outward from the cylindrical body 262. The keyed bushing 260 may be machined from a solid block 261 of aluminum material or prepared by fabricating, for example by welding, an aluminum stake 263 to a solid rod 264 of aluminum material. If formed by welding, heat treatment of the welded unit is done separate from the hinge arm, thereby maintaining the parent material properties of the hinge arm. A bore 265 is drilled axially through the machined or fabricated bushing blank to accommodate a hinge pin. It is to be understood that the bore 265 may be drilled either before or after the bushing is installed into the hinge arm under repair.

The outer diameter of the cylindrical body 262 of the bushing 260 is sized relative to the bore diameter of the bore 265 of the new hole 233 and the key 267 is sized relative to the keyway 235 associated with the new hole 233 to provide a press-fit relationship between the cylindrical body 262 of the keyed bushing 260 and the bore 265 and between the respective sides of the key 267 with the abutting surfaces of the keyway 235. The press-fit relationship serves to prevent the keyed bushing 260 from "backing out" of the bore 265 of the new hole 233 after the repaired hinge arm 290 is returned to service.

Figure 7:
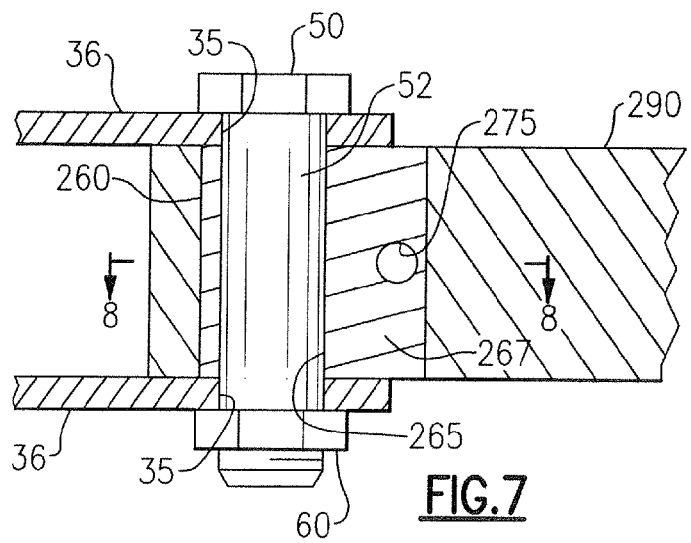
FIG. 7 is a sectioned side elevation view of another exemplary embodiment of a repaired hinge assembly.
Figure 8A:
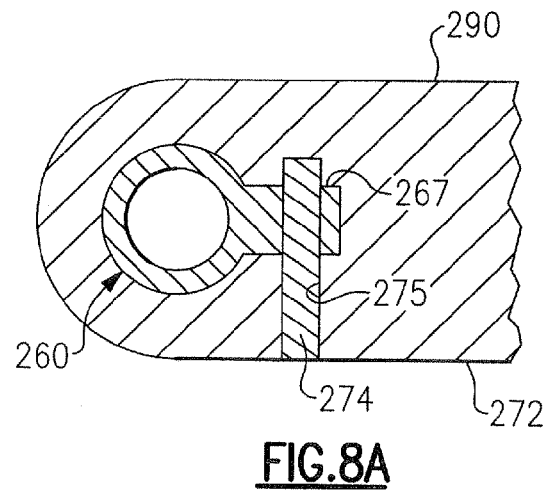
FIG. 8A is a plan view of the repaired hinge assembly of FIG. 7 taken along line 8-8.
Figure 8B:
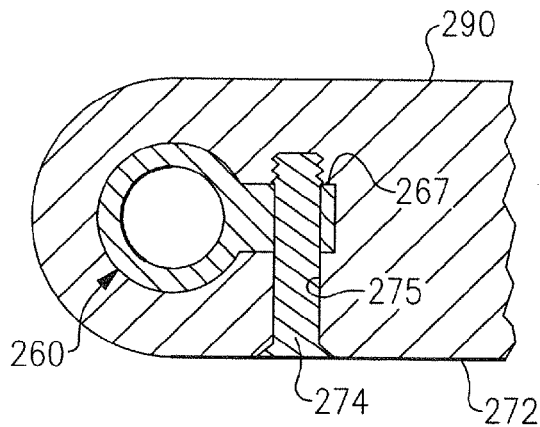
FIG. 8B is a plan view of another embodiment of the repaired hinge assembly of FIG. 7 taken along line 8-8.

Referring now to FIGS. 7-8, to provide additional assurance that the keyed bushing 260 will not "back out" of the hole 233, the key 267 may be staked to the repaired hinge arm 232 after being positioned within the keyway 255. For example, a staking hole 275 may be drilled transversely into the side 272 of the repaired hinge arm 232 so as to extend through the key 267 and the keyway 255. A staking pin 274 may be inserted into the staking hole 275 so as to extend through the key 267 and the keyway 255 thereby locking the keyed bushing 262 into place and preventing the key 267, and therefore the keyed bushing 260, from backing out. In an embodiment, the staking pin 274 has a shaft that may be sized relative to the staking hole 275 to provide a press fit between the staking pin 274 and the staking hole 275 when the staking pin 274 is inserted into the staking hole 275, such as illustrated in FIG. 8A. In an embodiment, the staking pin 274 may be secured into the stacking hole 275 by application of a retaining compound, such as for example Loctite 635 marketed by Henkel Aerospace, alone or in conjunction with the use of a press fit. In an embodiment, the staking pin 274 may be secured in the staking hole 275 by a threaded connection therebetween. For example, the portion of the staking hole 275 on the far side of the keyway 255 and the distal end of the staking pin 274 may be threaded whereby the staking pin 274 may be screwed into the lock hole 275, such as illustrated in FIG. 8B. With the key 267 being held within the keyway 255, either by press-fit or by locking with a stacking pin, rotation of the repaired hinge arm 232 relative to the keyed bushing 260 is prevented.

Figure 6:
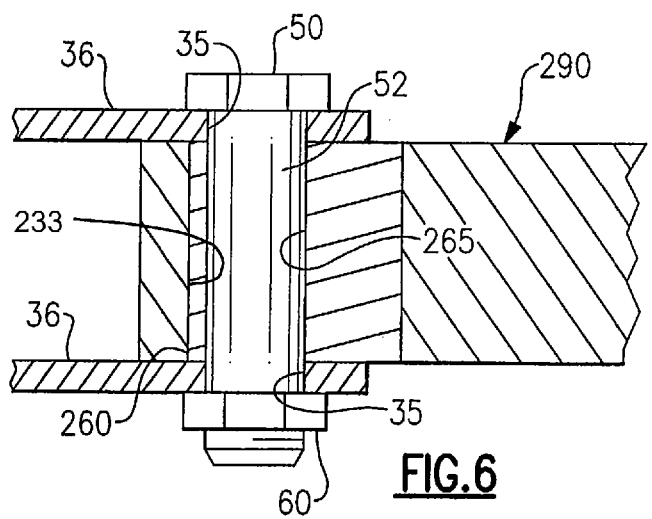
FIG. 6 is a sectioned side elevation view of an exemplary embodiment of a repaired hinge assembly.

To reinstall the repaired hinge arm 290 into service, the base plate of the hinge arm is remounted to the inside structure of the access door and the distal end of the repaired hinge arm 290 is reinserted between the pair of pivot arms 36 as illustrated in FIGS. 6 and 7. With the bore 265 of the keyed bushing 260 in the repaired hinge arm 290 aligned with the holes 35 in the respective pivot arms 36, a hinge pin 50 is inserted through the aligned holes. The hinge pin 50 may be a bolt having a shaft 52 having a threaded distal end adapted to receive a threaded nut 60 for locking the hinge pin 50 in place. The portion of the shaft 52 of the hinge pin 50 in contact with the inside bore of the keyed busing 262 is unthreaded and has a shaft diameter that is sized relative to the inside diameter of the bore through the keyed bushing 262 to provide a proper clearance, i.e. not too loose and not to tight, between the hinge pin 50 and the bore through the keyed bushing 262. The amount of clearance desired is a design consideration and is within the skill of a person of ordinary skill in the art.

The use of a keyed bushing in accordance with the method described herein prevents rotation of the inserted bushing relative to the hinge arm without concern for the lack of structural thickness of the strap portion of the hinge arm. In the method disclosed herein, staking is accomplished through the key and the keyway of the hinge arm on the side of the hole opposite from and spaced away from the thinned strap portion of the hinge arm. Thus, a relatively thick-walled bushing having sufficient structural thickness to support the key and the staking of the key to the hinge arm can be used when repairing a hinge arm in accordance with the method described herein, thereby eliminating the problems associated with prior art repair methods such as hereinbefore described.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiment of a hinge arm for a hinge assembly for an access door of a gas turbine engine as illustrated in the drawing, it will be recognized by those skilled in the art that various modifications may be made without departing from the spirit and scope of the invention. For example, the method disclosed herein may be used in repairing hinge arms of hinge assemblies in other applications wherein the hinge arm has a hinge pin hole having a worn bore, particularly when the hinge arm has been structurally weakened as a result. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A method for repairing a hinge arm having a hinge pin hole having a worn bore, the method comprising the steps of:
    forming in the worn hinge arm a new hole with a keyway extending outwardly from the new hole; and
    providing a keyed bushing having a cylindrical body and a key extending outwardly from the cylindrical body;
    drilling a central bore extending axially through the keyed bushing; and
    inserting the keyed bushing into the new hole and keyway formed in the hinge arm.

2. The method for repairing a hinge arm as recited in claim 1 wherein the step of forming in the worn hinge arm a new hole with a keyway extending outwardly from the new hole comprises the steps of:
    drilling the new hole coaxially through the worn hinge hole, the new hole having a larger diameter bore relative to the worn hinge pin hole; and
    machining the keyway in the hinge arm, the keyway extending outwardly from the new hole away from a strap portion of the hinge arm.

3. The method for repairing a hinge arm as recited in claim 1 wherein the key and the keyway are sized relative to each other to provide a press-fit between the key and the keyway when the key is inserted into the keyway.

4. The method for repairing a hinge arm as recited in claim 1 wherein the keyed bushing has an outer diameter and the new hole formed in the hinge arm has a bore diameter, the outer diameter of the keyed bushing and the bore diameter of the new hole sized relative to each other to provide a press fit between the keyed bushing and the bore of the new hole when the keyed bushing is inserted into the new hole in the hinge arm.

5. The method for repairing a hinge arm as recited in claim 1 further comprising the steps of:
    providing a staking hole extending transversely into the hinge arm through the keyway and the key of the keyed bushing disposed in the keyway; and
    inserting a staking pin into the staking hole, the staking pin extending transversely through the keyway and the key of the keyed bushing disposed within the keyway.

6. The method for repairing a hinge arm as recited in claim 5 further comprising the step of sizing a shaft of the staking pin relative to the staking hole to provide a press fit between the staking pin and the staking hole when the staking pin is inserted into the staking hole.

7. The method for repairing a hinge arm as recited in claim 5 wherein the step of inserting a staking pin into the staking hole comprises threading a threaded staking pin into the stacking hole.

8. The method for repairing a hinge arm as recited in claim 5 further comprising the step of locking the staking pin in the staking hole with a retaining compound.

9. A method for repairing a hinge arm of a hinge assembly of an access door on a gas turbine engine, the hinge arm having a hinge pin hole having a worn bore, the method comprising the steps of:
    drilling a new hole in the hinge arm coaxially through the worn hinge hole;
    machining a keyway in the hinge arm, the keyway extending outwardly from the bore of the new hole away from a strap portion of the hinge arm;
    providing a keyed bushing having a cylindrical body having an outer diameter and a key extending outwardly from the cylindrical body;
    sizing the outer diameter of the keyed bushing and the bore diameter of the new hole relative to each other to provide a press fit between the keyed bushing and the bore of the new hole when the keyed bushing is inserted into the new hole in the hinge arm;
    sizing the key and the keyway relative to each other to provide a press-fit between the key and the keyway when the key is inserted into the keyway;
    drilling a central bore extending axially through the keyed bushing; and
    inserting the keyed bushing into the new hole and keyway fanned in the hinge arm.

10. The method of repairing a hinge arm as recited in claim 9, further comprising the steps of:
    providing a staking hole extending transversely into the hinge arm through the keyway and the key of the keyed bushing disposed in the keyway; and
    inserting a staking pin into the staking hole, the staking pin extending transversely through the keyway and the key of the keyed bushing disposed within the keyway.

11. The method for repairing a hinge arm as recited in claim 10 further comprising the step of sizing the staking pin relative to the staking hole to provide a press fit between the staking pin and the staking hole when the staking pin is inserted into the staking hole.

12. The method for repairing a hinge arm as recited in claim 10 wherein the step of inserting a staking pin into the staking hole comprises threading a threaded staking pin into the stacking hole.

13. The method for repairing a hinge arm as recited in claim 10 further comprising the step of locking the staking pin in the staking hole with a retaining compound.

14. A repaired hinge arm for a hinge assembly for an access door of a gas turbine engine, comprising;
    a hole extending through a distal end of the hinge arm, the hole having a keyway extending outwardly from hole into the hinge arm; and
    a keyed bushing disposed within the hole through the hinge arm, the keyed bushing having a cylindrical body having an outer diameter, a central bore extending axially therethrough and a key extending outwardly from the cylindrical bore into the keyway, the key of the keyed bushing being staked to the keyway.

15. The repaired hinge arm as recited in claim 14 wherein the keyed bushing has an outer diameter and said hole formed in the distal arm of the hinge arm has a bore diameter, the outer diameter of the keyed bushing and the bore diameter of said hole sized relative to each other to provide a press fit between the keyed bushing and the bore of said hole when the keyed bushing is disposed within said hole.

16. The repaired hinge arm as recited in claim 14 wherein the key of the keyed bushing and the keyway in the hinge arm are sized relative to each other to provide a press-fit between the key and the keyway when the keyed bushing is disposed within said hole.

17. The repaired hinge arm as recited in claim 14 further comprising: a staking hole extending transversely into the hinge arm through the keyway and the key of the keyed bushing disposed in the keyway; and a staking pin disposed in the staking hole, the staking pin extending transversely through the keyway and the key of the keyed bushing disposed within the keyway.

* * * * *